United States Patent Office 3,781,371
Patented Dec. 25, 1973

---

3,781,371
2-ADAMANTYL- AND 2,6-DIADAMANTYL-p-CRESOLS
Alfred F. Talbot, Wallingford, Pa., assignor to Sun Research and Development Co., Philadelphia, Pa.
No Drawing. Filed Jan. 24, 1973, Ser. No. 326,343
Int. Cl. C07c 39/12
U.S. Cl. 260—619 D     11 Claims

ABSTRACT OF THE DISCLOSURE

New adamantane substituted cresols having the structures:

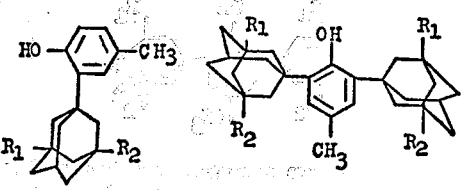

wherein $R_1$ and $R_2$ are hydrogen or hydrocarbyl radicals containing from 1 to 10 carbon atoms selected from the group of alkyl, cycloalkyl and aryl. The novel compositions of matter are useful as polymer stabilizers which inhibit the decomposition of hydrocarbon polymers like polyethylene, polypropylene, polybutenes, styrenebutadiene copolymers, poly(4 methyl pentene) and the like.

BACKGROUND OF THE INVENTION (1) Field of the invention

The invention relates to novel adamantane substituted cresols and to the process of making same.

(2) Description of the prior art

The carbon nucleus of adamantane compounds contains ten carbon atoms arranged in a symmetrical (strainless) manner such that there are three condensed six-membered rings and four bridgehead carbon atoms. The structure of adamantane is typically depicted as follows:

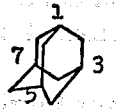

As shown the bridgehead carbon atoms customarily are designated by the numerals 1, 3, 5 and 7 respectively.

Numerous compounds containing the adamantane nucleus have been prepared heretofore. However, preparation of derivative having a group containing a cresol nucleus attached to the adamantane nucleus does not appear to have been heretofore achieved.

SUMMARY OF THE INVENTION

It has now been found that adamantane substituted cresols having the structures:

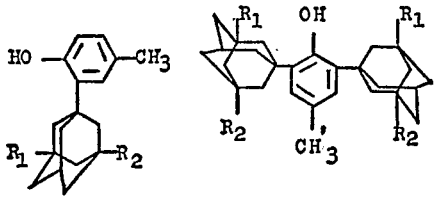

where $R_1$ and $R_2$ are hydrogen or hydrocarbyl radicals containing from 1 to 10 carbon atoms selected from the group of alkyl, cycloalkyl and can be successfully prepared by an alkylation type reaction of the cresol with the corresponding halogen substituted adamantane compound with a hydrated ferric chloride catalyst at an alkylating temperature in the range of 100 to 170° C. The compositions of the present invention are useful as polymer stabilizers which inhibit the decomposition of hydrocarbon polymers.

DESCRIPTION OF THE PREFERRED EMBODIMENTS

In accordance with the method of my invention the halogen substituted adamantane or alkyl adamantane starting material is contacted with cresol in the presence of an alkylation catalyst. For example, 1-chloro-3,5-dimethyladamantane is admixed with p-cresol and the mixture is heated in the presence of a catalytic amount of a hydrated ferric chloride or other alkylation catalyst. Reaction occurs according to the following equation:

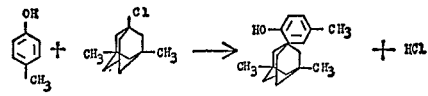

The reaction will produce alkylation at the 2-position of the p-cresol if a large excess of p-cresol is employed, e.g. at a molar ratio of p-cresol to halo-adamantane of 3:1 to 10:1. Conversely, di-alkylation of the p-cresol in the 2 and 6 positions:

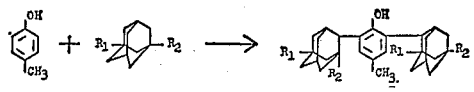

occurs when a large excess of halo-adamantane is employed, e.g. at a molar ratio of 3:1 to 10:1.

As is apparent from the foregoing equation, the $R_1$ and $R_2$ substituents on the adamantane nucleus are unaffected and remain in place during the reaction.

The preferred halogen substituted adamantane starting material for the present process is a bridgehead bromo- or chloro-adamantane having 10–30 carbon atoms, 0 to 3 bridgehead hydrocarbon radicals and 0–6 nonbridgehead hydrocarbon radicals, each having 1–10 carbon atoms, selected from the group consisting of alkyl, cycloalkyl and aryl. These radicals can contain branched chains, however, tertiary hydrocarbon atoms are not desirable in the hydrocarbon substituent since they would compete in the alkylation reaction and contribute to a more complex product. Thus adamantanes having 0–2 bridgehead hydrocarbon radicals selected from the group consisting of straight chain alkyl and phenyl are preferred.

Particularly preferred starting materials are the bridgehead bromo- or chloro-derivatives of adamantane, dimethyl adamantane and diethyladamantane.

The halogen substituted adamantane and alkyladamantane starting materials are known and disclosed in the following references: Smith and Williams, Journal of Organic Chemistry, 26, 2207 (1961); Stetter and Wulff, Chem. Ber., 93, 1366 (1960); Stetter, Anguw, Chem. International Edition, vol. 1 (1962); German Pat. 1,101,-410; U.S. Pat. 3,096,372; U.S. Pat. 3,577,468; and U.S. Pat. 3,666,806.

The phenolic compounds useful in this invention are mono- and di-adducts of p-cresol and dimethyladamantane as well as mono- and di-adducts of p-cresol and adamantane.

The following examples illustrate the invention:

EXAMPLE I 24.3 grams (0.1 gr. mol) of 1-bromo-3,5-dimethyladamantane are admixed with 54.1 grams (0.5 gr. mol) of para-cresol in the presence of 0.005 gram of

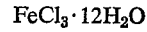

The mixture is maintained at 130 to 170° C. for 10 to 60 minutes or until HBr evolution ceases, with agitation and inert (N₂) gas purge. The reaction mixture is treated with 20% NaOH solution to remove residual catalyst, HBr and unreacted p-cresol. The main reaction product, 1-(3-methyl - 6 - hydroxyphenyl) - 3,5 - dimethyladamantane, is purified by fractional vacuum distillation of the neutralized, dried reaction product.

EXAMPLE II 145.9 grams (0.6 gr. mol) of 1-bromo-3,5-dimethyladamantane are mixed with 10.8 grams (0.1 gr. mol) of para-cresol in the presence of 0.01 gram FeCl₃·12H₂O. The mixture is heated to 140–160° C. with agitation and an inert gas purge, and maintained at that temperature for 10–60 minutes or until evolution of HBr ceases. After cooling, the reaction mixture is washed with water to remove residual catalyst and HBr, then dried. The main reaction product, 4-methyl-2,6-di-(3,5-dimethyladamantyl)phenol, may be isolated from unreacted starting material and by-products by fractional distillation under high vacuum.

The adamantane substituted phenolic compounds of this invention have particular utility as stabilizing agents for the thermal and/or oxidative decomposition of many hydrocarbon polymers.

The invention claimed is:

1. As a new composition of matter, compounds having the structure:

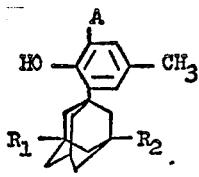

wherein R₁ and R₂ are hydrocarbyl radicals containing from 1 to 10 carbon atoms selected from the group consisting of alkyl, cycloalkyl and aryl and A is selected from the group consisting of hydrogen and the structure:

2. As a new composition of matter, compounds having the structure:

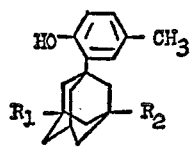

wherein R₁ and R₂ are hydrogen or hydrocarbyl radicals containing from 1 to 10 carbon atoms selected from the group consisting of alkyl, cycloalkyl and aryl.

3. A compound according to claim 2 wherein R₁ is hydrogen and R₂ is selected from the group consisting of alkyl, cycloalkyl and aryl.

4. A compound according to claim 2 wherein R₁ and R₂ are selected from the group consisting of alkyl, cycloalkyl and aryl.

5. A compound according to claim 2 wherein R₁ and R₂ are selected from the group consisting of methyl and ethyl.

6. A compound according to claim 2 wherein R₁ and R₂ are methyl.

7. As a new composition of matter, compounds having the structure:

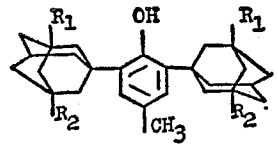

wherein R₁ and R₂ are hydrogen or hydrocarbyl radicals containing 1 to 10 carbon atoms selected from the group consisting of alkyl, cycloalkyl and aryl.

8. A compound according to claim 7 wherein R₁ is hydrogen and R₂ is selected from the group consisting of alkyl, cycloalkyl and aryl.

9. A compound according to claim 7 wherein R₁ and R₂ are selected from the group consisting of alkyl, cycloalkyl and aryl.

10. A compound according to claim 7 wherein R₁ and R₂ are selected from the group consisting of methyl and ethyl.

11. A compound according to claim 7 wherein R₁ and R₂ are methyl.

References Cited

UNITED STATES PATENTS 3,357,948  12/1967  Stockman et al. -- 260—619 D X

FOREIGN PATENTS 1,810,343  7/1969  Germany -------- 260—619 D

OTHER REFERENCES

Udding et al.: "Tetrahedron Letters," No. 11, pp. 1345–50, 1968.

LEON ZITVER, Primary Examiner

N. MORGENSTERN, Assistant Examiner

U.S. Cl. X.R.

260—45.95